(12) United States Patent
Song

(10) Patent No.: US 7,008,326 B2
(45) Date of Patent: Mar. 7, 2006

(54) CONSTANT VELOCITY UNIVERSAL JOINT

(75) Inventor: Zexi J. Song, Fenton, MI (US)

(73) Assignee: Delphi Technologies, Inc., Troy, MI (US)

( * ) Notice: Subject to any disclaimer, the term of this patent is extended or adjusted under 35 U.S.C. 154(b) by 35 days.

(21) Appl. No.: 10/457,622

(22) Filed: Jun. 9, 2003

(65) Prior Publication Data

US 2004/0248658 A1 Dec. 9, 2004

(51) Int. Cl.
 *F16D 3/223* (2006.01)
(52) U.S. Cl. .................................... 464/144; 464/906
(58) Field of Classification Search ............... 464/144, 464/906, 145
See application file for complete search history.

(56) References Cited

U.S. PATENT DOCUMENTS

| | | | |
|---|---|---|---|
| 1,886,847 A | 11/1932 | Tenney et al. | |
| 2,134,563 A | 10/1938 | Koppel | |
| 2,321,448 A | 6/1943 | Anderson | |
| 2,325,460 A | 7/1943 | Amberg | |
| 2,361,135 A | 10/1944 | Sturges | |
| 2,559,563 A | 7/1951 | Ransom | |
| 2,578,764 A | 12/1951 | Trbojevich | |
| 2,875,600 A * | 3/1959 | Miller, Jr. | 464/145 |
| 2,928,263 A | 3/1960 | Devos | |
| 3,002,364 A * | 10/1961 | Bellomo | 464/144 |
| 3,071,943 A | 1/1963 | Kings | |
| 3,083,548 A * | 4/1963 | Zeidler | 464/144 |
| 3,298,200 A | 1/1967 | Altmann et al. | |
| 3,592,023 A | 7/1971 | Okoshi | |
| 3,747,369 A | 7/1973 | Morin | |
| 3,919,861 A * | 11/1975 | Bellomo | 464/144 |
| 4,083,202 A | 4/1978 | Westercamp | |
| 4,377,385 A | 3/1983 | Sindelar | |
| 4,449,956 A | 5/1984 | Ueno | |
| 6,159,103 A | 12/2000 | Lu | |
| 6,186,899 B1 | 2/2001 | Thomas et al. | |
| 6,190,260 B1 | 2/2001 | Flores et al. | |
| 6,206,785 B1 | 3/2001 | Thomas | |
| 6,390,925 B1 | 5/2002 | Perrow | |
| 6,443,844 B1 | 9/2002 | Perrow | |
| 6,468,164 B1 | 10/2002 | Song | |
| 6,533,667 B1 | 3/2003 | Perrow et al. | |
| 6,533,668 B1 | 3/2003 | Mizukoshi et al. | |
| 6,582,313 B1 | 3/2003 | Le Mouellic et al. | |
| 6,616,537 B1 | 9/2003 | Thomas et al. | |

FOREIGN PATENT DOCUMENTS

| | | |
|---|---|---|
| DE | 19507859 | 9/1996 |
| GB | 200297 | 7/1923 |
| GB | 987572 | 3/1965 |
| GB | 995137 | 6/1965 |

* cited by examiner

*Primary Examiner*—Greg Binda
(74) *Attorney, Agent, or Firm*—Michael D. Smith

(57) ABSTRACT

A constant velocity universal joint has an outer race provided with longitudinally extending, circumferentially spaced outer race grooves in its inner concave surface. An inner race is provided with longitudinally extending, circumferentially spaced inner race grooves in its outer convex surface. The inner race is disposed within the outer race with its outer convex surface spherically engaged with the inner concave surface of the outer race for relative angular movement of the inner and outer races. Each of the inner race grooves is arranged opposite a corresponding one of the outer race grooves to define a plurality of ball-groove pairs. The grooves of each ball-groove pair are disposed in transverse crossing-relation to one another. A ball is disposed in each of the crossing ball-groove pairs for movement therealong during the relative angular movement of the inner and outer races.

3 Claims, 10 Drawing Sheets

CONSTANT VELOCITY UNIVERSAL JOINT

This invention relates generally to universal joints and more particularly to a constant velocity universal joint.

BACKGROUND OF THE INVENTION

Typically, a constant velocity universal joint has inner and outer spherical races coupled together by a series of balls engaging generally parallel grooves in the races. It is important that the speed of rotation of the two races remains always the same, whatever the angular adjustment of the axes of the two races. This depends on maintaining the plane of the balls so as to bisect the angle of adjustment. At present, this is accomplished by placing a spherical cage between the races, slotted to hold the balls. However, the provision of a cage increases cost, adds an additional part, and generates excess heat in operation.

SUMMARY OF THE INVENTION

The constant velocity universal joint of the present invention dispenses with the cage. The two races spherically engage one another. Each ball is confined by a pair of grooves consisting of a groove in the outer race and a groove in the inner race, with the grooves of each pair in crossing relation to one another so that the ball is properly located. However, a ball can drop out when torque is applied to one of the races and one groove tends to rotate relative to the other. To overcome this problem, and in accordance with one embodiment of this invention, all outer race grooves are circumferentially inclined in one direction, all inner race grooves are circumferentially inclined in the opposite direction, alternate outer race groove centers are offset to one side of the spherical center, the remaining outer race groove centers are offset to the opposite side of the spherical center, and the inner race groove center of each groove pair is offset from the spherical center to the side opposite the side to which the center of the paired outer race groove is offset.

In accordance with a second embodiment of the invention, alternate outer race grooves are circumferentially inclined in one direction and the remaining outer race grooves are circumferentially inclined in the opposite direction. Each inner race groove is inclined oppositely to the outer race groove with which it is paired. All outer race groove centers are offset to the same side of the spherical center and all inner race groove centers are offset to the same (but opposite) side of the spherical center. The inner race groove center of each groove pair is offset from the spherical center to a side opposite the side to which the center of the paired outer race groove is offset.

An object of the invention is to provide a constant velocity universal joint having the foregoing features and capabilities.

BRIEF DESCRIPTION OF THE DRAWINGS

Other objects, features and advantages of the invention will become more apparent as the following description proceeds, especially when considered with the accompanying drawings.

DETAILED DESCRIPTION OF THE PREFERRED EMBODIMENT

Figure 1:
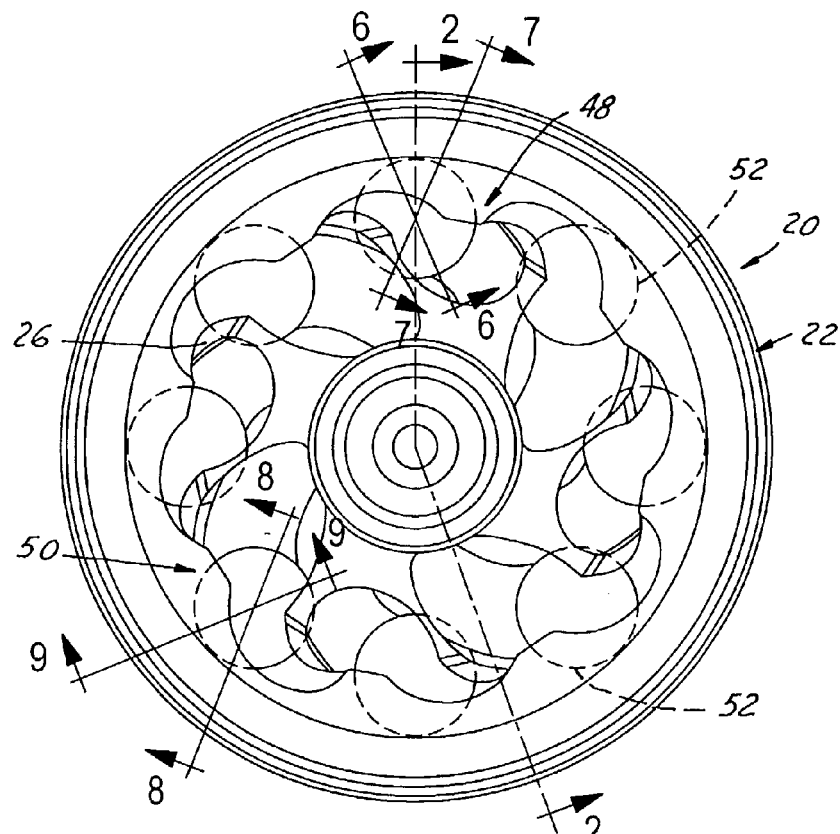
FIG. 1 is an end view of a universal joint constructed in accordance with this invention.
Figure 2:
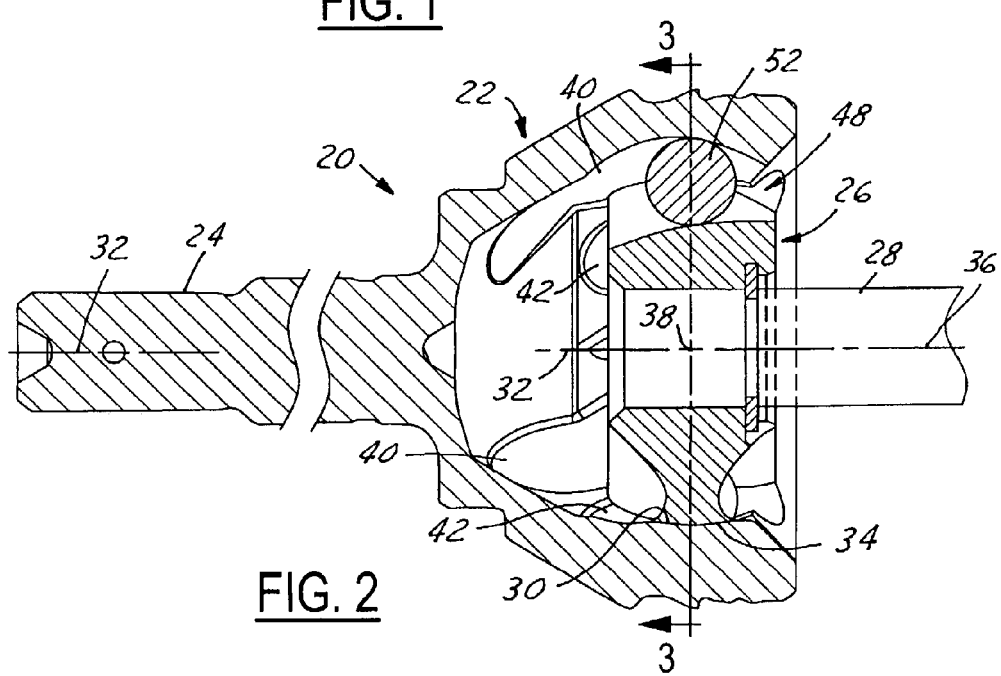
FIG. 2 is a sectional view taken on the line 2—2 in FIG. 1.
Figure 3:
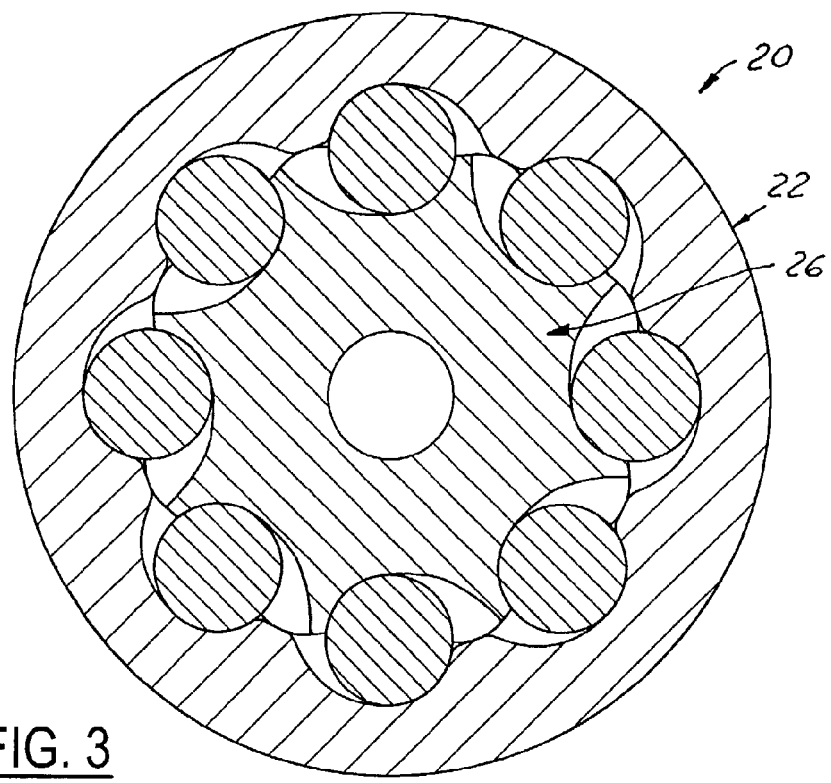
FIG. 3 is a sectional view taken on the line 3—3 in FIG. 2.
Figure 4:
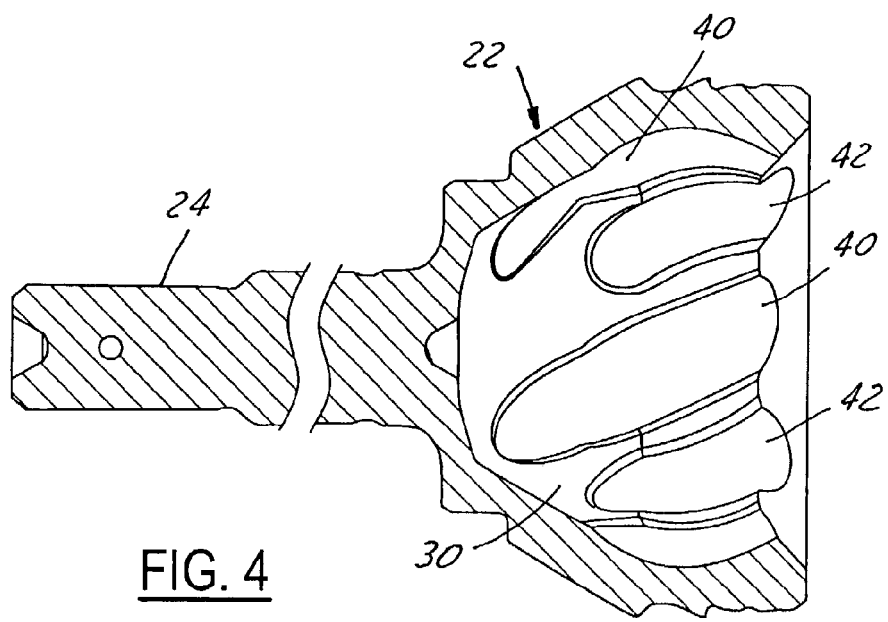
FIG. 4 is a sectional view of the outer race in FIG. 2.
Figures 5, 19:
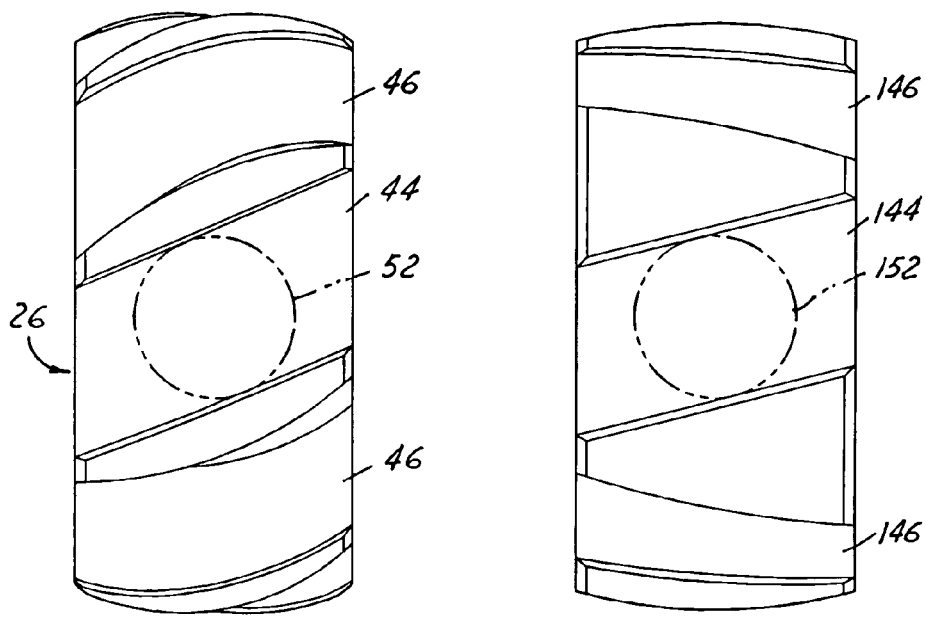
FIG. 5 is a side elevational view of the inner race.
FIG. 19 is a side elevational view of the inner race of the embodiment shown in FIG. 16.
Figure 10:
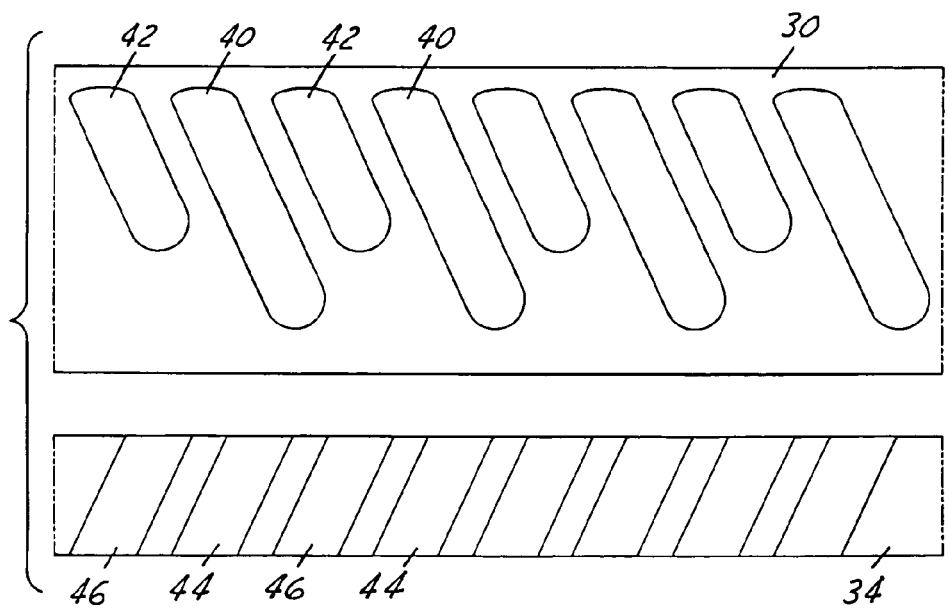
FIG. 10 is a development of the outer and inner races, showing the groove pattern thereof.
Figure 6:
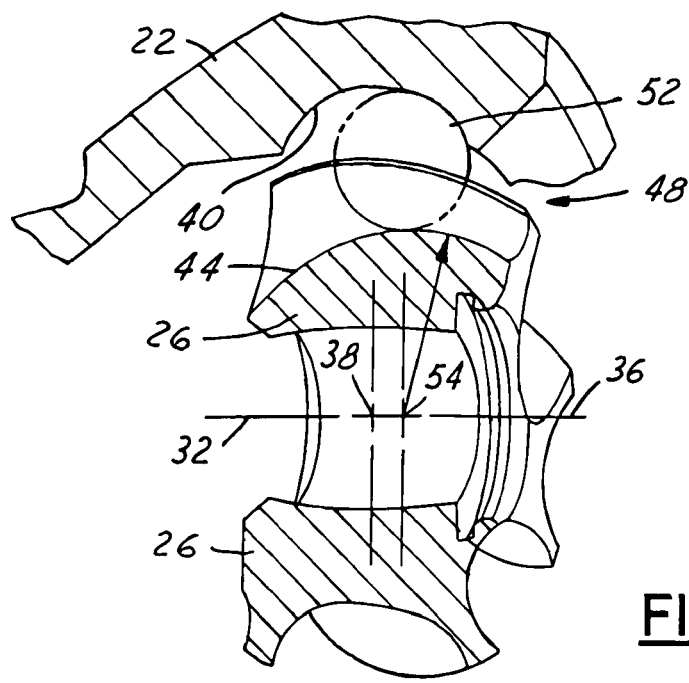
FIG. 6 is a fragmentary sectional view taken on the line 6—6 in FIG. 1.

Referring now more particularly to the drawings and especially FIGS. 1–15, there is shown a constant velocity universal joint 20 having an outer race 22 which is integral with or otherwise secured to a shaft 24, and an inner race 26 which is integral with or otherwise attached to a shaft 28. The outer race 22 has an inner, spherical, concave surface 30 disposed about a longitudinal axis 32 of the outer race. The inner race 26 has an outer, spherical, convex surface 34 disposed about a longitudinal axis 36 of the inner race. The inner and outer races 22, 26 and their spherical surfaces 30 and 34 have a common center 38, which is the center of the joint, and the surfaces 30 and 34 are spherically engaged with one another.

Figure 12:
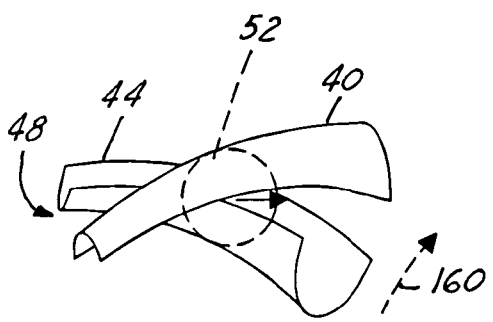
FIG. 12 is a diagrammatic perspective view showing a ball between one pair of outer and inner race grooves.
Figure 14:
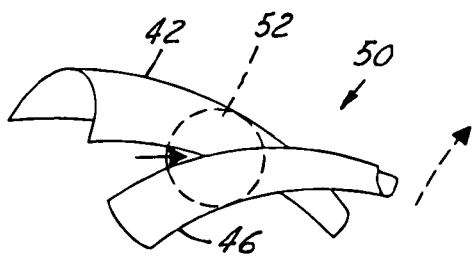
FIG. 14 is a diagrammatic perspective view showing a ball between another pair of outer and inner race grooves.
Figure 13:
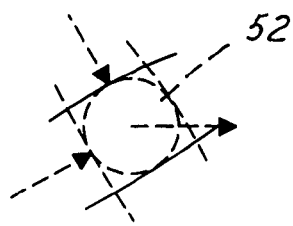
FIG. 13 is a diagrammatic view looking down on the showing in FIG. 12.
Figure 15:
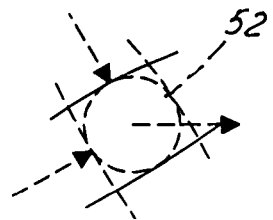
FIG. 15 is a diagrammatic view looking down on the showing in FIG. 14.
Figure 16:
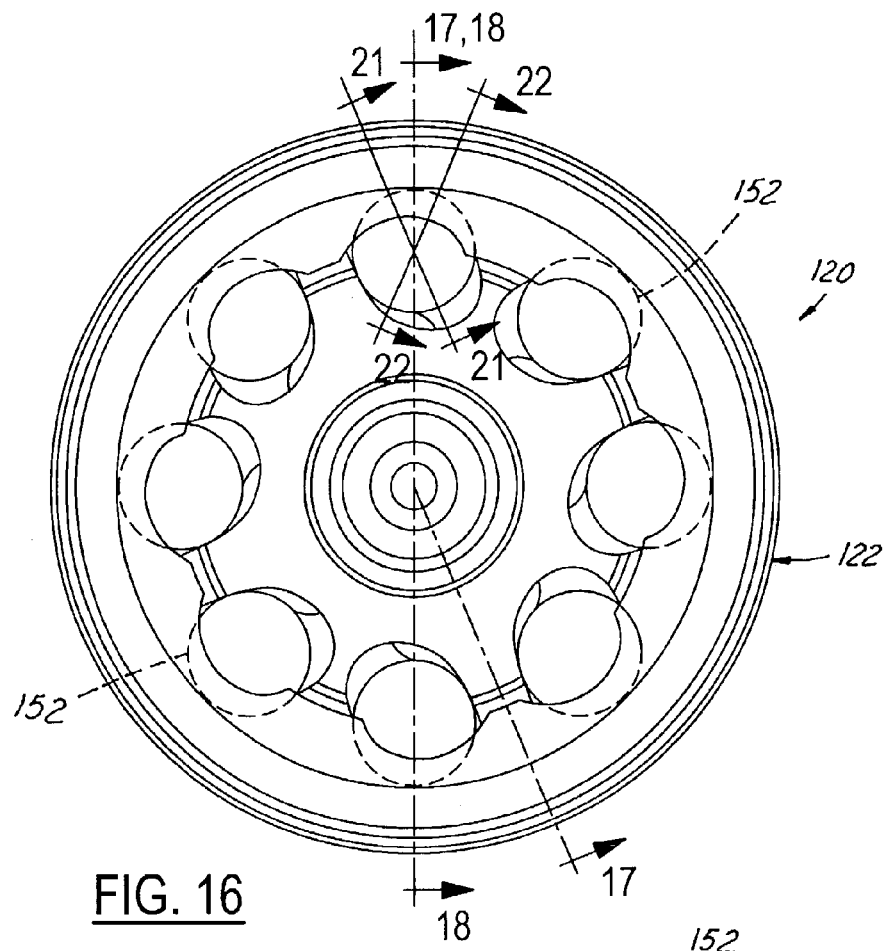
FIG. 16 is an end view of a universal joint of modified construction.
Figure 17:
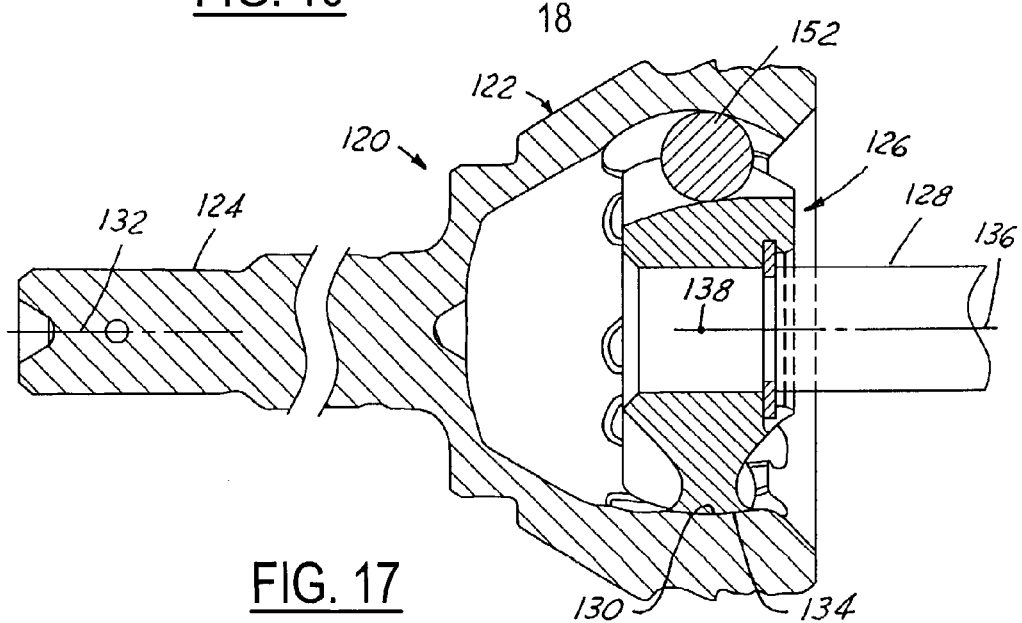
FIG. 17 is a sectional view taken on the line 17—17 in FIG. 16.
Figure 18:
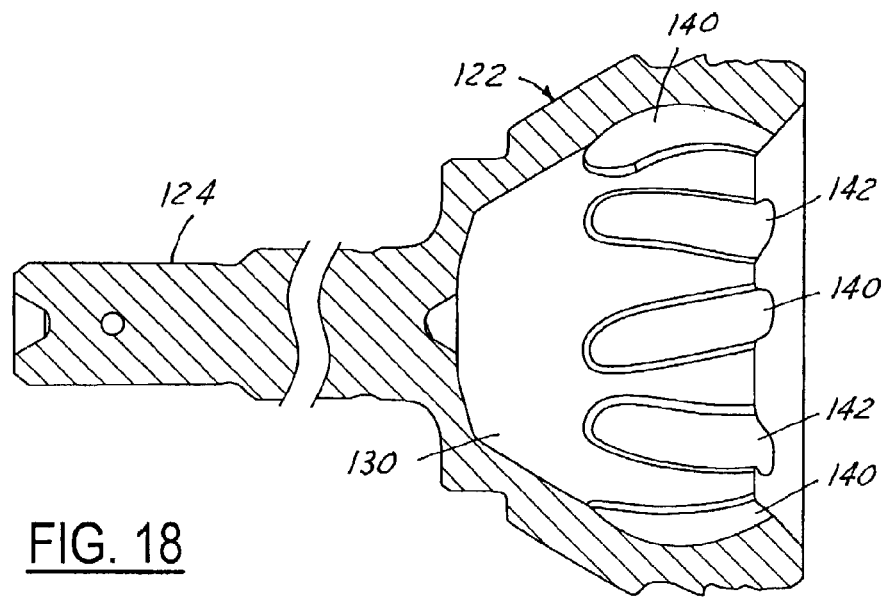
FIG. 18 is a sectional view of the outer race shown in FIG. 16, and taken on the line 18—18 in FIG. 16.
Figure 20:
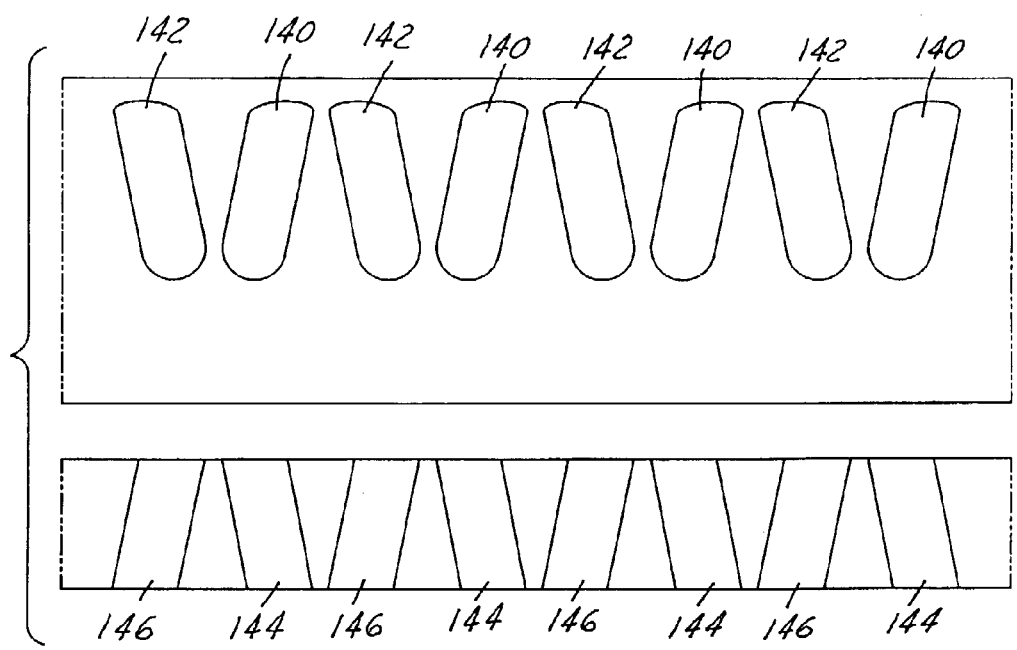
FIG. 20 is a development of the outer and inner races of the embodiment of FIG. 16, showing the groove pattern thereof.
Figure 21:
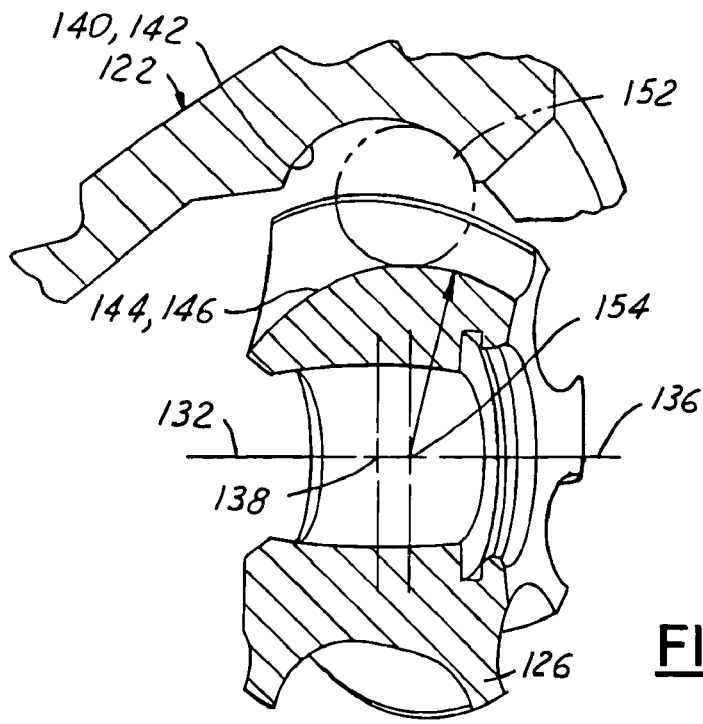
FIG. 21 is a fragmentary sectional view taken on the line 21—21 in FIG. 16.
Figure 22:
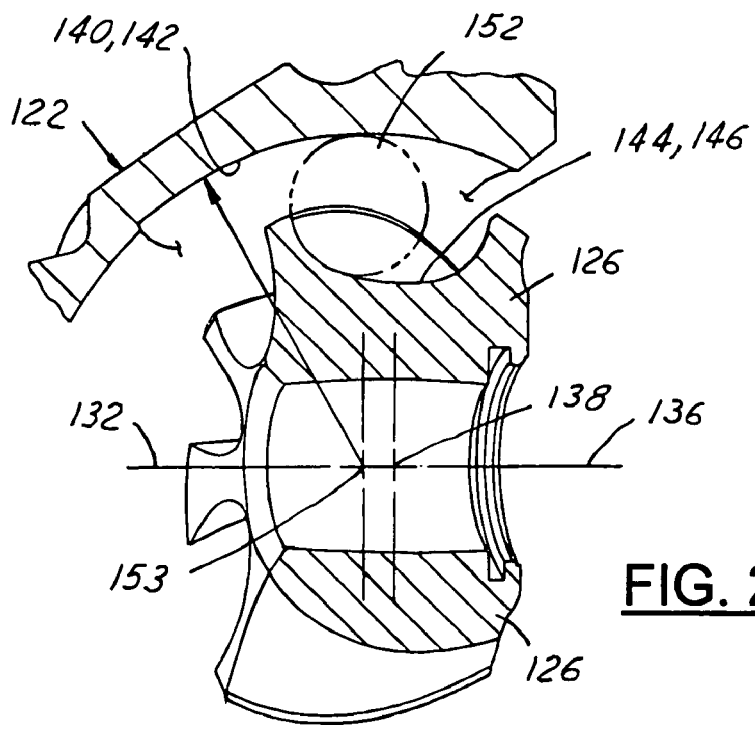
FIG. 22 is a fragmentary sectional view taken on the line 22—22 in FIG. 16.
Figure 23:
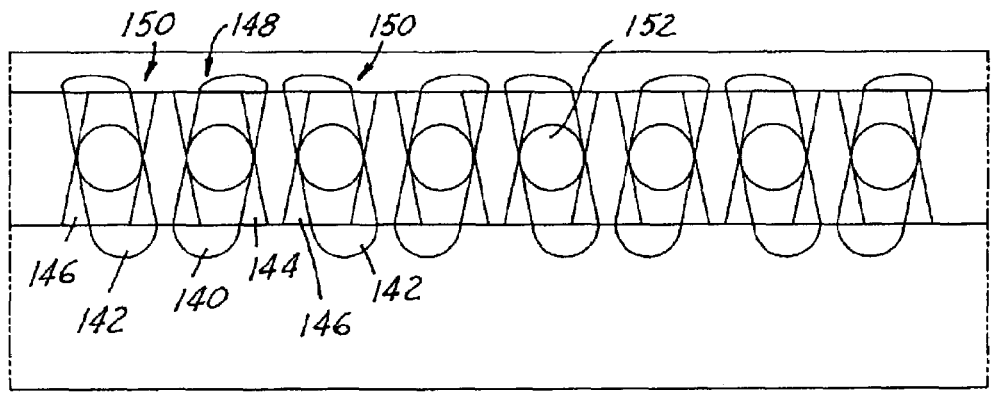
FIG. 23 is a development of the outer and inner races, showing the groove patterns in FIG. 20 overlain with one another.

The concave surface 30 of the outer race 20 has a plurality (in this embodiment 8) of arcuate, generally longitudinally extending, circumferentially spaced outer race grooves 40 and 42 which are alternated with one another. The convex surface 34 of the inner race 26 has the same number of arcuate, generally longitudinally extending, circumferentially spaced inner race grooves 44 and 46 with are alternated with one another. The grooves 40 and 44 of the two races are paired with one another to provide a plurality of groove pairs 48 (FIG. 12). The grooves 42 and 46 of the two races are paired with one another to provide a plurality of groove pairs 50 (FIG. 14).

All of the outer race grooves 40 and 42 are inclined circumferentially in one direction and all of the inner race grooves 44 and 46 are inclined circumferentially in the opposite direction so that the grooves 40, 44 of each of the groove pairs 48 are in crossing relation to one another, and the grooves 42, 46 of each of the groove pairs 50 are in crossing relation to one another. See FIGS. 4, 5, 10 and 11.

A torque-transmitting ball 52 is confined by the outer race groove and the inner race groove of each of the groove pairs 48 and 50.

Figure 7:
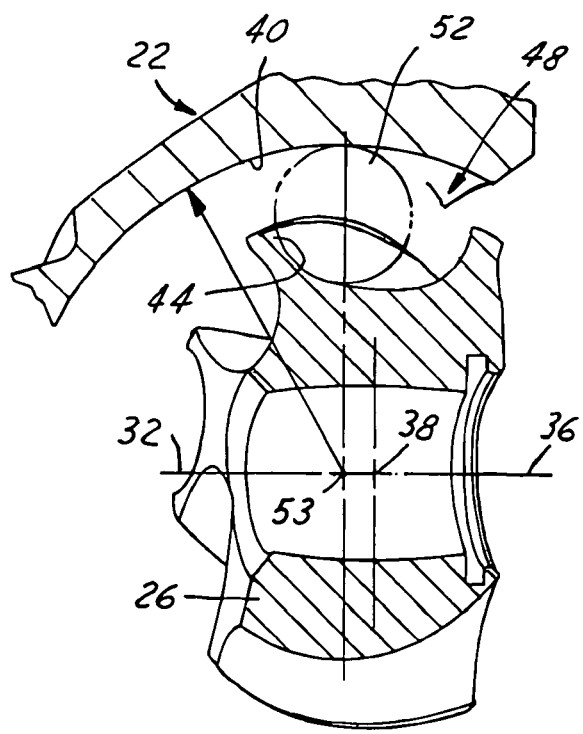
FIG. 7 is a fragmentary sectional view taken on the line 7—7 in FIG. 1.
Figure 8:
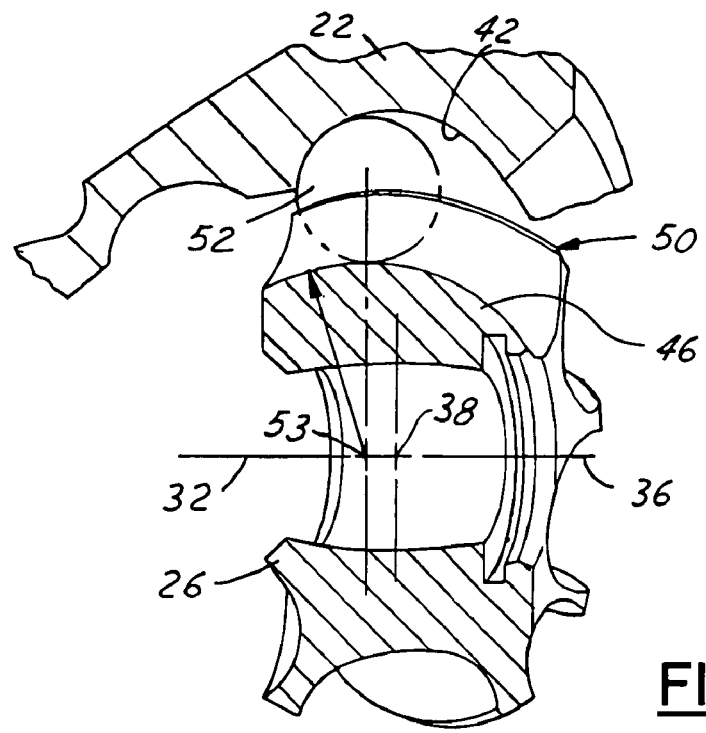
FIG. 8 is a fragmentary sectional view taken on the line 8—8 in FIG. 1.
Figure 9:
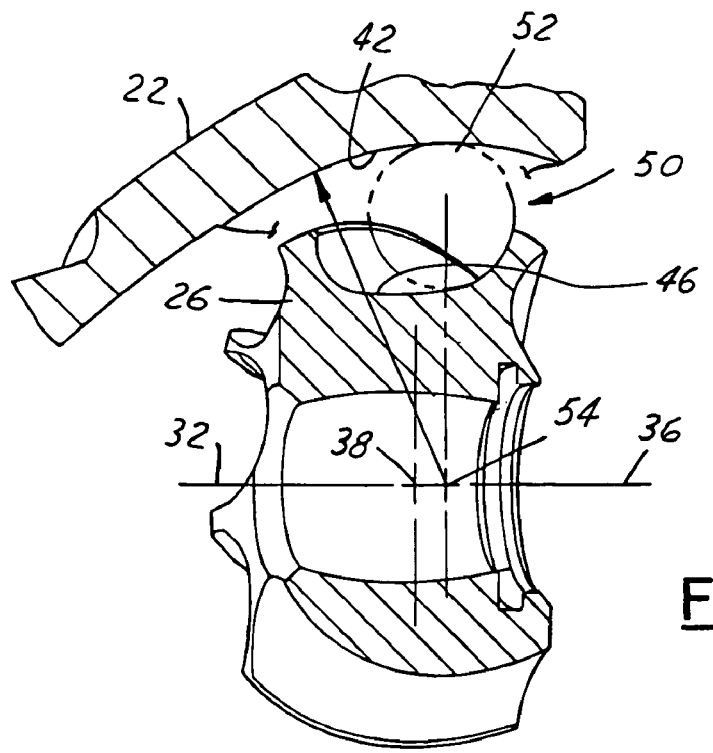
FIG. 9 is a fragmentary sectional view taken on the line 9—9 in FIG. 1.
Figure 11:
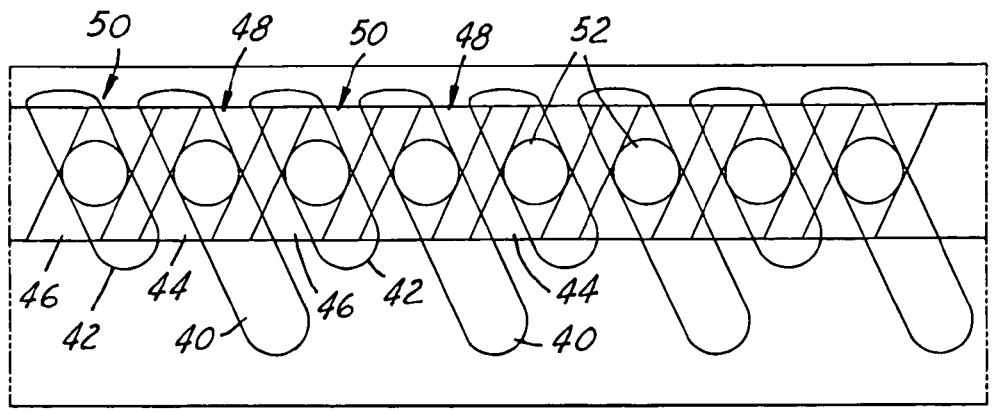
FIG. 11 is a development of the outer and inner races, showing the groove patterns overlain with one another.

The alternate outer race grooves 40 are arcuate and have centers of curvature located at 53 offset to one side of the joint center 38 (FIG. 7). The remaining outer race grooves 42 are arcuate and have centers of curvature located at 54 offset to the opposite side of the joint center 38 (FIG. 9). The alternate inner race grooves 44 have centers of curvature at 54 and the remaining inner race grooves 46 have centers of curvature at 53. See FIGS. 6 and 8. The centers 53 and 54 are offset the same distance from the joint center 38.

Referring now to FIGS. 16–27, there is shown a constant velocity universal joint 120 having an outer race 122 which is splined or otherwise secured to a shaft 124, and an inner race 126 which is integral with or otherwise attached to a shaft 128. The outer race 122 has an inner, spherical, concave surface 130 disposed about a longitudinal axis 132 of the outer race. The inner race 126 has an outer, spherical, convex surface 134 disposed about a longitudinal axis 136 of the inner race. The inner and outer races 122, 126 and their spherical surfaces 130 and 134 have a common center 138, which is the center of the joint, and the surfaces 130 and 134 are spherically engaged with one another.

Figure 24:
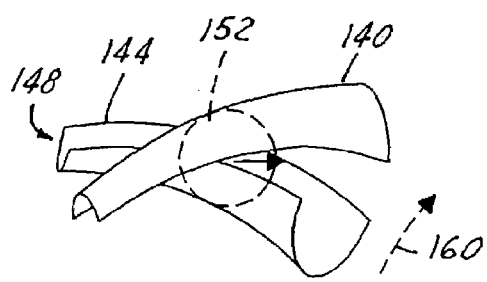
FIG. 24 is a diagrammatic perspective view showing a ball between one pair of outer and inner race grooves of the universal joint shown in FIG. 16.
Figure 26:
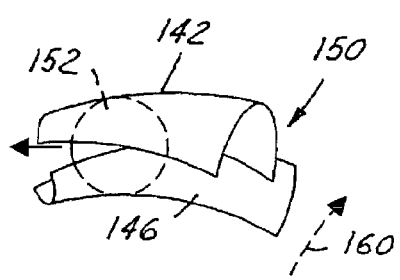
FIG. 26 is a diagrammatic perspective view showing a ball between another pair of outer and inner race grooves of the universal joint shown in FIG. 16.
Figure 25:
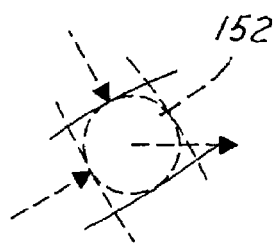
FIG. 25 is a diagrammatic view looking down on the showing in FIG. 24.
Figure 27:
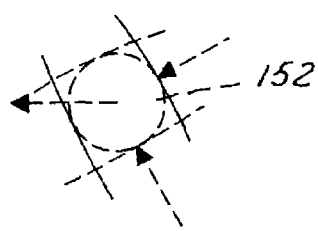
FIG. 27 is a diagrammatic view looking down on the showing in FIG. 26.

The concave surface 130 of the outer race 120 has a plurality (again there are eight) of arcuate, generally longitudinally extending, circumferentially spaced outer race grooves 140 and 142 which are alternated with one another. The convex surface 134 of the inner race 126 has the same number of arcuate, generally longitudinally extending, circumferentially spaced inner race grooves 144 and 146 which are alternated with one another. The grooves 140 and 144 of the two races are paired with one another to provide a plurality of groove pairs 148 (FIG. 24). The grooves 142 and 146 of the two races are paired with one another to provide a plurality of groove pairs 150 (FIG. 26).

Alternate grooves 140 of the outer race 120 are inclined circumferentially in one direction and the remaining grooves 142 are inclined circumferentially in the opposite direction. Alternate grooves 144 of the inner race 126 are circumferentially inclined oppositely to the grooves 140 with which they are paired, and the remaining inner race grooves 146 are circumferentially inclined oppositely to the grooves 142 with which they are paired. Thus the grooves of each pair are inclined oppositely to one another.

A torque-transmitting ball 152 is confined by the outer race groove and the inner race groove of each of the groove pairs 148 and 150.

All of the outer race grooves 140 and 142 are arcuate and have centers of curvature located at 153 offset to one side of the joint center 138. All of the inner race grooves 144 and 146 are arcuate and have centers of curvature located at 154 offset to the opposite side of the joint center 138. The centers 153 and 154 are offset the same distance from the joint center 138. See FIGS. 21 and 22.

As pointed out above, even with crossing grooves, the balls can drop out when torque is applied to one of the races. However this situation is avoided by both of the embodiments of the invention previously described.

Referring first to the embodiment in FIGS. 1–15, there will be seen diagrammatically in FIGS. 12–15, the relationship of two crossing grooves 40 and 44 of a groove pair 48, and two crossing grooves 42 and 46 of a groove pair 50. All of the grooves are of uneven depth throughout their length due to the offset of the groove centers from the spherical center. In the perspective view of the groove pair 48 (FIG. 12), it will be seen that there is greater groove depth to the right than to the left. As the inner race groove 44 tends to rotate into the paper (as noted by the arrow 160 in the perspective view), the front wall of the inner race groove 44 will push the ball against the back wall of the outer race groove 40. The forces from both groove walls will drive the ball to the right as shown in the front view. Since the grooves 40 and 44 have more depth to the right, nothing will stop movement of the balls to the right, except for the existence of the groove pairs 50.

Referring to the perspective view of the groove pair 50 (FIG. 14), it will be seen that the grooves 42 and 46 are of less depth to the right. Thus as the inner race groove 46 tends to rotate into the paper, the front wall of the inner race groove 46 will push the ball against the back wall of the outer race groove 42. These forces shown in the front view will drive the ball to the right. But the ball cannot get through the narrower channel of the grooves 42 and 46. The ball becomes locked in the crossing pair of the grooves 42, 46 and stops the rotation of the inner race groove relative to the outer race groove. Thus all of the groove pairs 50 will stop the relative rotation of all of the groove pairs 48 so that all balls will be contained in the crossing groove pairs. The outer race will thus rotate together with the inner race. It should be noted that in this case only the groove pairs 48 will carry the torque.

Considering now the second embodiment in FIGS. 16–27, there is seen diagrammatically in FIGS. 24–27, the relationship of two crossing grooves 140 and 144 of a groove pair 148 and two crossing grooves 142 and 146 of a groove pair 150. All inner race groove centers are offset symmetrically to one side of the sphere center and all outer race groove centers are offset symmetrically to the opposite side of the groove center, and the grooves in each race are alternately inclined in opposite directions.

As seen in the front view of FIGS. 24 and 26, the inner race groove 144 of the groove pair 148 is inclined out of the paper, while the inner race groove 146 of the pair 150 are inclined into the paper. All of the outer race grooves 140 and 142 are symmetrically inclined in the opposite direction to their paired inner race grooves 146 and 148.

All groove pairs have less groove depth to the left and more depth to the right. Assuming that the inner race grooves tend to rotate into paper as indicated by the arrow 160, then the front walls of the inner race grooves will tend to push the ball against the back walls of the outer race grooves. The forces tend to drive the ball of the groove pair 148 to the right, which is the direction of more groove depth. But the forces of groove pair 150 tend to drive the ball to the left, in which direction the crossed groove pair has less depth. Accordingly, the ball gets stuck and stops the relative rotation of the inner and outer races, so that the outer race rotates with the inner race.

In both embodiments of the invention, the crossing groove pairs maintain the balls in a plane which bisects the angle of adjustment of the two races, and the speed of rotation of the two races remains always the same whatever the angular adjustment.

What is claimed is:

1. A constant velocity universal joint comprising:
an outer race having an inner, spherical, concave surface disposed about a longitudinal axis of said outer race,
a plurality of arcuate, generally longitudinally extending, circumferentially spaced outer race grooves in said concave surface of said outer race,
an inner race having an oater, spherical, convex surface disposed about a longitudinal axis of said inner race,
a plurality of arcuate, generally longitudinally extending, circumferentially spaced inner race grooves in said convex surface of said inner race,
said inner race being disposed concentrically within said outer race with said convex surface spherically engaged with said concave surface for relative angular movement of said inner and outer races about a common joint center,
each of said inner race grooves being arranged opposite a corresponding one of the outer race grooves to define a plurality of ball-groove pain,
the grooves of each ball-groove pair being disposed in transverse crossing relation to one another, and
a plurality of torque-transmitting balls, one of said balls being disposed in each of said ball-groove pairs for movement therealong during such relative angular movement of said inner and outer races, wherein the outer race grooves of one or more of the ball-groove pairs have centers which are axially spaced from said joint center to one side of said joint center, the inner race grooves of said one or more of the ball-groove pairs have centers which are axially spaced from said joint center to a second side opposite said one side of said joint center, the outer race grooves of the ball-groove pairs other than said one or more of the ball-groove pairs have centers which are axially spaced from said joint center to said second side of the joint center, and the inner race grooves of the ball-groove pairs other than said one or more groove pairs have centers which are axially spaced from said joint center to said one side of the joint center.

2. A constant velocity universal joint comprising:
an outer race having an inner, spherical, concave surface disposed about a longitudinal axis of said outer race,
a plurality of arcuate, generally longitudinally extending, circumferentially spaced outer race grooves in said concave surface of said outer race,
an inner race having an outer, spherical, convex surface disposed about a longitudinal axis of said inner race,
a plurality of arcuate, generally longitudinally extending, circumferentially spaced inner race grooves in said convex surface of said inner race,
said inner race being disposed concentrically within said outer race with said convex surface spherically engaged with said concave surface for relative angular movement of said inner and outer races about a common joint center,
each of said inner race grooves being arranged opposite a corresponding one of the outer race grooves to define a plurality of ball-groove pairs,
the grooves of each ball-groove pair being disposed in transverse crossing relation to one another, and
a plurality of torque-transmitting balls, one of said balls being disposed in each of said ball-groove pairs for movement therealong during such relative angular movement of said inner and outer races, wherein the outer race grooves of all of the ball-groove pairs are inclined in one circumferential direction, and the inner race grooves of all of the ball-groove pairs are inclined in a direction which is opposite said one circumferential direction, wherein the outer race grooves of one or more of the ball-groove pairs have centers which are axially spaced from said joint center to one side of said joint center, the inner race grooves of said one or more of the ball-groove pairs have centers which are axially spaced from said joint center to a second side opposite said one side of said joint center, the outer race grooves of the ball-groove pairs other than said one or more of the ball-groove pairs have centers which are axially spaced from said joint center to said second side of the joint center, and the inner race grooves of the ball-groove pairs other than said one or more groove pairs have centers which are axially spaced from said joint center to said one side of the joint center.

3. The constant velocity universal joint of claim 2, wherein said one or more ball-groove pairs constitute one-half the total number of said ball-groove pairs.

* * * * *